US005311903A

United States Patent [19]

Poulin

[11] Patent Number: 5,311,903

[45] Date of Patent: May 17, 1994

[54] APPARATUS FOR MEASURING THE MECHANICAL MOTION OF A MAGNET VALVE ARMATURE FOR CONTROLLING FUEL INJECTION IN A FUEL INJECTION SYSTEM

[75] Inventor: Philippe Poulin, St. Symphorien d'Ozon, France

[73] Assignee: Robert Bosch GmbH, Stuttgart, Fed. Rep. of Germany

[21] Appl. No.: 996,252

[22] Filed: Dec. 23, 1992

[30] Foreign Application Priority Data

Dec. 24, 1991 [DE] Fed. Rep. of Germany ....... 4142996

[51] Int. Cl.[5] .............................................. F16K 31/06

[52] U.S. Cl. ................................ 137/554; 251/129.1; 251/129.04; 123/506

[58] Field of Search ........................ 251/129.1, 129.04; 137/554; 123/506, 458

[56] References Cited

U.S. PATENT DOCUMENTS

| | | | |
|---|---|---|---|
| 3,415,487 | 12/1968 | Robarge | 251/129.1 |
| 4,065,096 | 12/1977 | Frantz et al. | 251/129.1 |
| 4,342,331 | 8/1982 | Bartholdmäus | 137/554 |
| 4,546,749 | 10/1985 | Igashira et al. | 123/458 X |
| 5,009,389 | 4/1991 | Kawamura | 251/129.1 |

FOREIGN PATENT DOCUMENTS 3241521 10/1984 Fed. Rep. of Germany .

*Primary Examiner*—Arnold Rosenthal

*Attorney, Agent, or Firm*—Edwin E. Greigg; Ronald E. Greigg

[57] ABSTRACT

The invention is directed to a magnet valve having a magnet coil and a magnet armature, which are coaxially surrounded by a secondary coil that measures the inductions arriving in the magnet coil. According to the invention, those inductions that arise in the magnet coil not only from a current flowing there but also by the motion of the magnet armature in the magnet coil are measured while the current is turned off. As a result, the instant at which the magnet armature begins its return stroke is detected exactly.

2 Claims, 1 Drawing Sheet

APPARATUS FOR MEASURING THE MECHANICAL MOTION OF A MAGNET VALVE ARMATURE FOR CONTROLLING FUEL INJECTION IN A FUEL INJECTION SYSTEM

BACKGROUND OF THE INVENTION

The invention is based on a method for measuring or monitoring a mechanical motion of a magnet valve armature of electrically controlled injection systems, as defined hereinafter.

In one such known method of this kind (German Offenlegungsschrift 37 30 523), to monitor the mechanical motion of a magnet valve armature, the change in induction in the secondary coil, particularly that resulting from turning off the electric current in the magnet coil, is measured and further processed in a monitoring unit. Until the actual onset of motion of the armature in the direction resulting from the restoring force, there is a delay in the microsecond range, which can be extrapolated to determine the actual value of the adjustment, because it repeats with adequate precision in the various switching events.

Especially in fuel injection systems in which the valve closing member and the magnet armature are connected to one another and in which the injection process occurs while the magnet valve is closed, for instance so that, the closure or opening of the magnet valve determines the onset or end of injection, it is important that this opening or closing time be adhered to very precisely. The known method can ascertain only the instant of closing with high accuracy, because as a result of the applied voltage and its current imposition, accurate induction values of the magnet coil through the secondary coil can be ascertained for the closing process. When the current is turned off, the corresponding inductance signal does not immediately match the return stroke motion of the armature or in other words the onset of opening of the valve, even though the armature and the movable valve member are joined together in a manner fixed against relative motion, because a number of influences, especially hydraulic ones, are present that cannot be extrapolated computationally via the control unit and become an error in determining the quality of the injection.

OBJECT AND SUMMARY OF THE INVENTION

The method according to the invention has an advantage over the prior art that the actual return stroke motion of the armature, and hence the actual onset of the opening motion of the valve member, for instance, are measured or in other words need not be extrapolated, so that factors that are not located in the electrical drive field of the magnet valve have no influence on the measured value and hence upon the injection quantity control. Especially at the onset of the armature return stroke, for example as it lifts the valve member from the valve seat, or in other words as it opens the relief conduit of the pump work chamber with a corresponding interruption in injection (the beginning of the end of injection), induction peaks arise in the magnet coil in the opposite direction from the previous induction peaks upon turnoff of current, and these are transformed accordingly to the secondary coil and are detectable with minimization of the measurement delay. The same is true for the end of the return stroke of the armature upon its sudden change in motion to zero; once again, a considerable change in induction (reversal of the measurement peaks) occurs, which is adequately measurable and differentiatable.

In an advantageous feature of the invention, the induction peaks at the beginning and end of the return motion of the armature are evaluated especially. These measurement points define a control range of the magnet valve between the beginning of the end of injection and the actual end of injection, in which certain throttling effects of the valve from the closed to the fully opened cross section still occur which, however, are extrapolatable. The limit points are needed for the latter which, however, are measurable according to the invention.

In an apparatus for performing the method, which can be employed not only for the method of the invention, having a magnet valve that has a valve body with a movable valve member and has a cylindrical control magnet with an annular coil (magnet coil) and reciprocating armature, the invention provides that a secondary coil acting as a measuring coil for measuring the inductions created in the annular coil is disposed coaxially around the annular coil acting as a primary coil. In this way, the total diameter of the magnet valve including the secondary coil can be minimized.

In an advantageous embodiment of the invention, the secondary coil is disposed around a bush (core) that can be folded over the annular coil and can serve as a transformation core; in a further feature, the secondary coil is disposed axially on one side of the bush, and on the other side the bush has a spacer, embodied in particular as a shank, for determining its position.

This makes it possible to adapt the dimensions, in terms of diameter and height or position of the secondary coil, of the apparatus according to the invention to the particular magnet valve to be measured or monitored. A bush of this kind, provided with a secondary coil, can accordingly act as a transducer, either only for adjusting an injection system or for final checking of magnet valves, or may be employed in continuous operation in order to use the measurement variables in an electronic controller.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
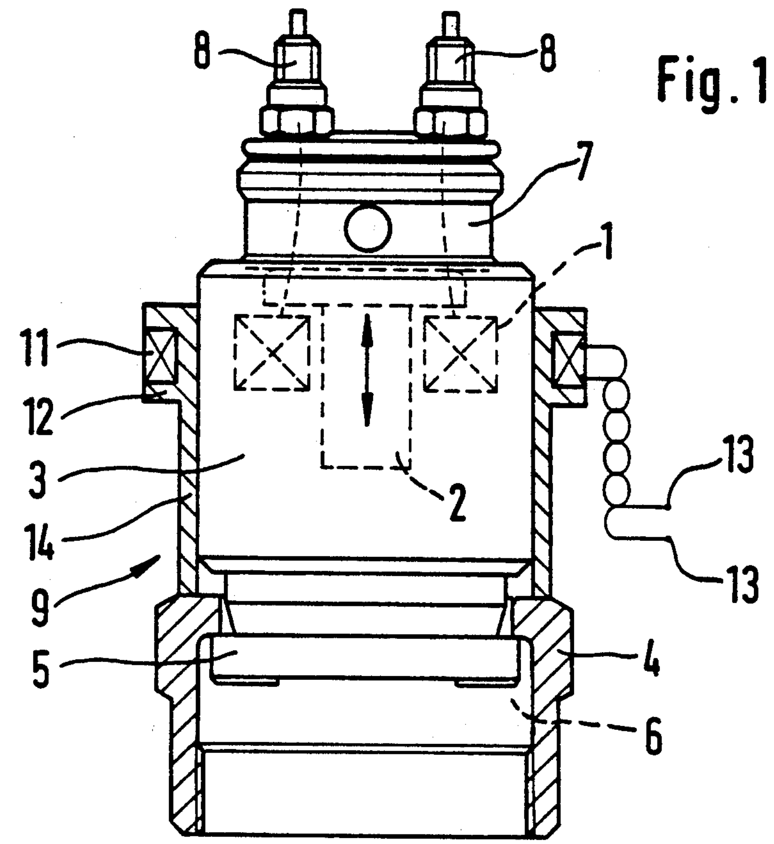
FIG. 1 shows a magnet valve, highly simplified and partly in longitudinal section.

FIG. 1 shows a magnet valve with a magnet coil and magnet armature 2, shown in dashed lines as if seen by X-ray. The coil, along with other parts of the magnet valve that belong to the magnet but are not shown in further detail, is encapsulated in a magnet valve housing 3; the outer face of this magnet valve housing 3 is embodied cylindrically in the region of the coil. In this special exemplary embodiment, the magnet valve is secured via a union nut 4, which engages a corresponding shoulder 5 of the magnet valve housing 3, to one end 6 of a hydraulic apparatus, such as an injection system.

The magnet valve housing 3 is connected to the electrical terminals 8 via a plug-in nipple 7.

According to the invention, a bush 9 is provided on the cylindrical portion of the magnet valve housing 3, and there is an annular groove 12 on the bush 9 for receiving a secondary coil 11; this annular groove is connected to an amplifier or electronic control unit or measuring instrument via connecting cables 13. From the part of the bush 9 having the annular groove 12, a tubular portion 14 extends as a spacer as far as the union nut 4, so that the secondary coil 11 is given an optimized position, which, is necessary for the induction measurement. The bush 9 preferably acts as a core between the two coils, namely the magnet coil 1, as the primary coil, and the secondary coil 11.

As soon as an electric current flows through the primary coil 1, which is connected by the electrical terminals 8, a corresponding measurable voltage is induced in the secondary coil 11, which can be picked up at the terminals of the connecting cable 13 and is amplified via a suitable unit for utilization, for example in the form of a closed-loop control or measurement.

Advantageously, the bush can be pushed onto any conceivable magnet valve having a cylindrical magnet valve housing; only the diameter, or the device with the spacer 14, needs to be individually defined to determine the position of the secondary coil 11. Thus a measuring or monitoring device of this kind can on the one hand serve in final checking in magnet valve production, while it can also be used in repair facilities for monitoring the control course in the magnet valves; it can also be used for continuous duty as a transducer for a closed-loop control device, in which the instant of electrical excitation of the magnet coil, for instance, and the actual reverse motion of the armature are controlled, accordingly as a function of the actual control times of the valve.

Figure 2:
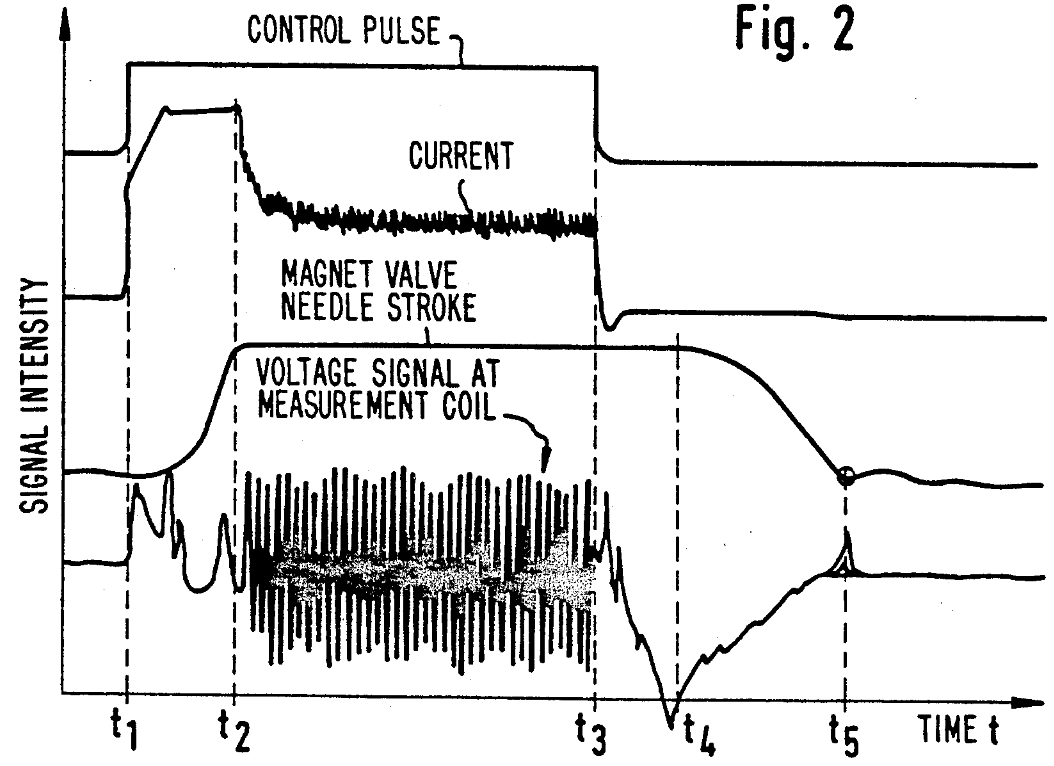
FIG. 2 shows a function diagram to explain the invention.

The function of the invention will now be described in terms of the diagram shown in FIG. 2, taking as an example the fact that the valve needle of the magnet valve, in other words the movable valve member, blocks the valve when the magnet coil 1 is electrically excited, while when the current is turned off the valve needle including the magnet armature 2 are displaced and thus the valve is re-opened. According to the invention, the valve function may also be reversed; that is, the valve may be one that is closed when without current. In the diagram in FIG. 2, the signal intensity at a particular time is plotted on the ordinate, over the time t on the abscissa. As soon as the control pulse at time $t_1$ supplies current to the magnet coil, a, current jump occurs, which rapidly thrusts the magnet valve needle into its closing position, which it has attained approximately at time $t_2$, after which the current curve also has a uniform course, as does the induction voltage at the secondary coil accordingly. Between time $t_1$ and $t_2$, the induction voltage executes jumps, which are easily measurable, so that a quite accurate, and if necessary extrapolatable, signal for the instant of closure of the magnet valve can be obtained via the induction measurement. As soon as the control pulse turns off the current at time $t_3$, the induction voltage drops accordingly as well—that is, the curve sags downward. Then, however, as soon as the magnet armature is displaced in the magnet coil by the movable valve member upon its opening motion, or in other words from time $t_4$ on (the dropping of the armature curve), a not inconsiderable induction voltage, but with the opposite direction, is generated in the magnet coil and accordingly in the secondary coil, so that a clear opportunity for measurement exists then. This induction voltage is ended whenever the opening stroke has ended, at time $t_5$. This point is clearly measurable as well. After that, the entire switching process begins all over again, as a result of a new control pulse.

All the characteristics described herein recited in the ensuing claims and shown in the drawings may be essential to the invention either individually or in any arbitrary combination with one another.

The foregoing relates to a preferred exemplary embodiment of the invention, it being understood that other variants and embodiments thereof ar possible within the spirit and scope of the invention, the latter being defined by the appended claims.

What is claimed and desired to be secured by letters patent of the U.S. is:

1. In an apparatus for measuring the mechanical motion of a magnet armature (2) of a magnet valve for controlling fuel injection in fuel injection systems, having a magnet coil (1) serving as a primary coil, by which the magnet armature is actuatable, and having a secondary coil (11) for measuring induction generated in the magnet coil (1) by a motion of the magnet armature after interruption of a flow of current through the magnet coil, and having an evaluation device for measuring a voltage generated in the secondary coil, the improvement comprising the magnet valve has a magnet valve housing (3) that in a region of the annularly embodied magnet coil (1) of the magnet valve is embodied cylindrically, the secondary coil (11) is disposed on a bush (9) that is slipped onto a cylindrical part of the magnet valve housing, said bush having a tubular portion (14) adapted to come to rest on a stop on the magnet valve housing, the tubular portion and the stop serving to define a position of the secondary coil (11) relative to the magnet coil (1), wherein said secondary coil surrounds said magnet coil in spaced relation thereto.

2. An apparatus as defined by claim 1, the improvement further comprising the secondary coil (11) is disposed in an outer annular groove (12) of the bush (9).

* * * * *